US012620598B2

(12) United States Patent (10) Patent No.: US 12,620,598 B2
Oura et al. (45) Date of Patent: May 5, 2026

(54) POSITIVE ELECTRODE FOR SECONDARY BATTERIES, AND SECONDARY BATTERY

(71) Applicant: Panasonic Intellectual Property Management Co., Ltd., Osaka (JP)

(72) Inventors: Yuji Oura, Osaka (JP); Tomoki Shiozaki, Osaka (JP); Hideharu Takezawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 463 days.

(21) Appl. No.: 17/585,919

(22) Filed: Jan. 27, 2022

(65) Prior Publication Data

US 2022/0149385 A1     May 12, 2022

Related U.S. Application Data

(60) Division of application No. 16/744,574, filed on Jan. 16, 2020, now abandoned, which is a continuation of
(Continued)

(30) Foreign Application Priority Data

Jul. 27, 2017     (JP) ................................. 2017-145297

(51) Int. Cl.
     H01M 4/66          (2006.01)
     H01M 4/02          (2006.01)
     H01M 4/70          (2006.01)
(52) U.S. Cl.
     CPC ............. H01M 4/667 (2013.01); H01M 4/70 (2013.01); *H01M 2004/021* (2013.01); *H01M 2004/028* (2013.01)

(58) Field of Classification Search
     CPC ................................. H01M 4/667; H01M 4/70
     See application file for complete search history.

(56) References Cited

U.S. PATENT DOCUMENTS

2004/0072067 A1 * 4/2004 Minami ............. H01M 10/052
                                                             29/623.5
2005/0079422 A1    4/2005 Ko et al.
                       (Continued)

FOREIGN PATENT DOCUMENTS

JP          2000269095 A  *  9/2000
JP          2004-14247 A       1/2004
                       (Continued)

OTHER PUBLICATIONS

Takeuchi et al., WO-2012128274 Machine Translation (Year: 2012).*
(Continued)

*Primary Examiner* — Ula C Ruddock
*Assistant Examiner* — Anna Korovina
(74) *Attorney, Agent, or Firm* — WHDA, LLP

(57)                    ABSTRACT

This positive electrode for secondary batteries is provided with: a positive electrode collector which has a plurality of recesses and projections in the surface; an intermediate layer which is provided on the surface of the positive electrode collector having the recesses and projections; and a positive electrode mixture layer which is provided on the intermediate layer and contains a positive electrode active material. This positive electrode for secondary batteries is configured such that: the intermediate layer contains conductive material particles and inorganic material particles that have a higher resistance than the positive electrode active material; and both the ratio of the central particle diameter of the conductive material particles to the average depth of the recesses and projections of the positive electrode collector and the ratio of the central particle diameter of the inorganic
(Continued)

material particles to the average depth of the recesses and projections of the positive electrode collector are 5:6 or less.

9 Claims, 2 Drawing Sheets

Related U.S. Application Data application No. PCT/JP2018/018625, filed on May 15, 2018.

(56)                References Cited

U.S. PATENT DOCUMENTS

| | | | | |
|---|---|---|---|---|
| 2013/0017440 A1* | 1/2013 | Takano | | H01M 4/139 |
| | | | | 429/211 |
| 2015/0303484 A1* | 10/2015 | Iida | | H01G 11/24 |
| | | | | 429/233 |
| 2016/0190566 A1* | 6/2016 | Shiozaki | | H01M 4/661 |
| | | | | 429/231.1 |

FOREIGN PATENT DOCUMENTS

| | | | | | |
|---|---|---|---|---|---|
| JP | 2005-123185 A | | 5/2005 | | |
| JP | 2009295474 A | * | 12/2009 | | |
| JP | 2013110100 A | * | 6/2013 | ............ | H01M 4/661 |
| JP | 2016-127000 A | | 7/2016 | | |
| WO | 2011/027455 A1 | | 3/2011 | | |
| WO | WO-2012128274 A1 | * | 9/2012 | ........ | H01M 10/4235 |

OTHER PUBLICATIONS

Inoue, JP-2009295474 Machine Translation (Year: 2009).*

Sugie, JP-2000269095 Machine Translation (Year: 2000).*

Takada et al., JP-2013110100 Machine Translation (Year: 2013).*

Translation of International Search Report Dated Aug. 7, 2018, issued in counterpart Application No. PCT/JP2018/018625. (2 pages).

Sugie et al., JP2000-269095 Machine translation (Year: 2000).

* cited by examiner

POSITIVE ELECTRODE FOR SECONDARY BATTERIES, AND SECONDARY BATTERY

CROSS REFERENCE TO RELATED APPLICATIONS

This application is a Division of U.S. patent application Ser. No. 16/744,574, filed Jan. 16, 2020, which is a Continuation of International Application No. PCT/JP2018/018625 filed May 15, 2018, which claims the benefit of Japanese Patent Application No. 2017-145297 filed in the Japan Patent Office on Jul. 27, 2017, each of which is incorporated by reference herein in its entirety.

TECHNICAL FIELD

The present disclosure relates to a secondary battery positive electrode and a technology of a secondary battery.

BACKGROUND ART

In recent years, as a secondary battery with high output and high energy density, a non-aqueous electrolyte secondary battery has been widely used, the battery comprising a positive electrode, a negative electrode, and a non-aqueous electrolyte wherein lithium ions are transferred between the positive electrode and the negative electrode for charge and discharge.

For example, Patent Literature 1 discloses a non-aqueous electrolyte secondary battery having a positive electrode, a negative electrode, and a non-aqueous electrolyte, wherein the above positive electrode comprises a positive electrode current collector, a positive electrode mixture layer formed on the above current collector, and an intermediate layer formed between the above positive electrode current collector and the above positive electrode mixture layer, and the above intermediate layer includes particles having a Vickers hardness of 5 GPa or more and mainly formed of a material having a thermal conductivity of 100 W/m·K or more and a specific resistance of $10^3$ Ω·m or more.

CITATION LIST

Patent Literature

PATENT LITERATURE 1: Japanese Unexamined Patent Application Publication No. 2016-127000

SUMMARY

Providing the intermediate layer between the positive electrode current collector and the positive electrode mixture layer as in Patent Literature 1, the amount of heat generated by the battery can be suppressed, for example, even when internal short circuit occurs inside the secondary battery, as compared with the case where no intermediate layer is provided. However, in a normal state in which no internal short circuit occurs, the intermediate layer between the positive electrode current collector and the positive electrode mixture layer becomes a resistance component, and hence the resistance of the positive electrode increases. An increase in resistance of the positive electrode may cause, for example, deterioration in battery characteristics, and hence suppressing an increase in resistance of the positive electrode is an important issue.

An object of the present disclosure is to provide a secondary battery comprising a secondary battery positive electrode capable of suppressing an increase in resistance of the positive electrode, and the secondary battery comprising the positive electrode, even when the intermediate layer is provided between the positive electrode current collector and the positive electrode mixture layer to suppress the amount of heat generated by the battery when internal short circuit occurs.

The secondary battery positive electrode according to the first aspect of the present disclosure comprises: a positive electrode current collector having a plurality of irregularities on the surface; an intermediate layer provided on the irregular surface of the above positive electrode current collector; and a positive electrode mixture layer provided on the above intermediate layer and including a positive electrode active material, and the above intermediate layer comprises: conductive agent particles; and inorganic material particles having higher resistance than the above positive electrode active material, and the ratio of the median particle diameter of the above conductive agent particles to the average depth of the irregularities of the above positive electrode current collector and the ratio of the median particle diameter of the above inorganic material particles to the average depth of the irregularities of the above positive electrode current collector are both 5:6 or less.

The secondary battery positive electrode according to the second aspect of the present disclosure comprises: a positive electrode current collector having a plurality of irregularities on the surface; an intermediate layer provided on the irregular surface of the above positive electrode current collector; and a positive electrode mixture layer provided on the above intermediate layer and including a positive electrode active material, and the above intermediate layer includes inorganic material particles having higher resistance than the above positive electrode active material, and the average depth of the irregularities of the above positive electrode current collector is 0.6 μm or more, and at least one of the projections of the irregularities of the above positive electrode current collector penetrates the interface between the above intermediate layer and the above positive electrode mixture layer and projects into the above positive electrode mixture layer.

The secondary battery according to the present disclosure comprises a positive electrode, a negative electrode, and an electrolyte, and the above positive electrode is the secondary battery positive electrode described above.

According to the present disclosure, an increase in resistance of the positive electrode can be suppressed even when the intermediate layer is provided between the positive electrode current collector and the positive electrode mixture layer to suppress the amount of heat generated by the battery when internal short circuit occurs.

DESCRIPTION OF EMBODIMENTS

Figure 1:
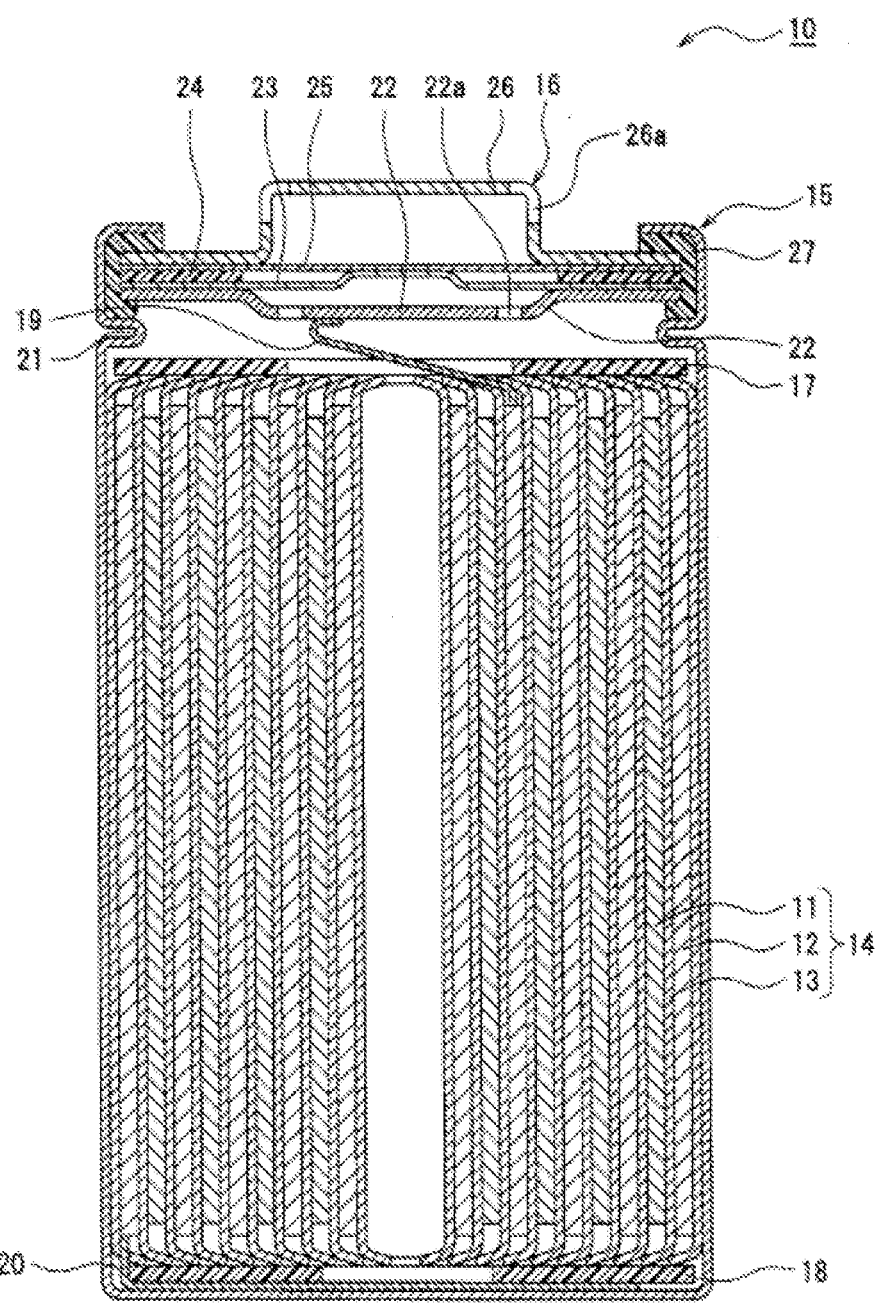
FIG. 1 is a sectional view of a secondary battery as an example of the embodiment.

The secondary battery positive electrode according to the first aspect of the present disclosure comprises: a positive electrode current collector having a plurality of irregularities on the surface; an intermediate layer provided on the irregular surface of the above positive electrode current collector; and a positive electrode mixture layer provided on the above intermediate layer and including a positive electrode active material, and the above intermediate layer comprises: conductive agent particles; and inorganic material particles having higher resistance than the above positive electrode active material, and the ratio of the median particle diameter of the above conductive agent particles to the average depth of the irregularities of the above positive electrode current collector and the ratio of the median particle diameter of the above inorganic material particles to the average depth of the irregularities of the above positive electrode current collector are both 5:6 or less. The intermediate layer on the irregular surface of the positive electrode current collector is formed, allowing conductive agent particles and inorganic material particles having a ratio of the median particle diameter to the average depth of the irregularities of 0.83 (5⁄6) or less to enter deeply into the recesses of the irregularities of the positive electrode current collector and to fill the recesses with conductive agent particles and inorganic material particles. The contact area between the recesses and the conductive agent particles is increased to allow an increase in resistance of the positive electrode to be suppressed. For example, when a conductive foreign matter and the like having a negative potential reaches the positive electrode current collector to occur internal short circuit, the intermediate layer including inorganic material particles having higher resistance than the positive electrode active material becomes a resistance component being present around the conductive foreign matter. Providing the intermediate layer suppresses short-circuit current flowing between the positive electrode current collector and the negative electrode during internal short circuit and to suppress the amount of heat generated by the battery, as compared with the case where no intermediate layer is provided.

The secondary battery positive electrode according to the second aspect of the present disclosure comprises: a positive electrode current collector having a plurality of irregularities on the surface; an intermediate layer provided on the irregular surface of the above positive electrode current collector; and a positive electrode mixture layer provided on the above intermediate layer and including a positive electrode active material, and the above intermediate layer includes inorganic material particles having higher resistance than the above positive electrode active material, and the average depth of the irregularities of the above positive electrode current collector is 0.6 µm or more, and at least one of the projections of the irregularities of the above positive electrode current collector penetrates the interface between the above intermediate layer and the above positive electrode mixture layer and projects into the above positive electrode mixture layer. Thus, at least one of the projections of the irregularities of the positive electrode current collector is in contact with the positive electrode mixture layer, forming a conduction path between the positive electrode current collector and the positive electrode mixture layer, and hence an increase in resistance of the positive electrode is suppressed. For example, when a conductive foreign matter and the like having a negative potential reaches the positive electrode current collector to occur internal short circuit, the intermediate layer including inorganic material particles having higher resistance than the positive electrode active material becomes a resistance component being present around the conductive foreign matter. Providing the intermediate layer suppresses short-circuit current flowing between the positive electrode current collector and the negative electrode during internal short circuit and to suppress the amount of heat generated by the battery, as compared with the case where no intermediate layer is provided.

In the present description, the median particle diameter means a particle diameter at which the cumulative particle volume is 50% in a volume-based particle size distribution measured by a laser diffraction particle size distribution measuring apparatus.

In the present description, the depth of the irregularities means the height from the bottom of the recesses to the top of the projections. The average depth of the irregularities of the positive electrode current collector is measured as follows. The positive electrode is embedded in a resin, and a cross section of the positive electrode is produced by cross section polisher (CP) processing or the like. The cross section of the positive electrode current collector is observed by a scanning electron microscope (SEM) over a predetermined length with a visual field of 1000-fold magnification, and the depths of all the irregularities observed in the observed image (height from the bottom of the recesses to the top of the projections) are measured. The predetermined length is 50 µm. The same operation is performed with five different visual fields, and the average value of the depths of all the evenness measured in each visual field is obtained, and this average value is regarded as the average depth of the irregularities of the positive electrode current collector.

Hereinafter, an example of the embodiment will be described in detail. The drawings referred in the description of the embodiment are schematically described, and the dimensional ratio of the component drawn in the drawings may be different from the actual one.

FIG. 1 is a sectional view of a secondary battery as an example of the embodiment. The secondary battery 10 shown in FIG. 1 comprises: a wound type electrode assembly 14 obtained by winding a positive electrode 11 and a negative electrode 12 together with a separator 13 therebetween; an electrolyte; insulating plates 17 and 18 respectively disposed above and below the electrode assembly 14; and a battery case for housing the above members. The battery case is composed of a case body 15 having a bottomed cylindrical shape and a sealing assembly 16. Instead of the wound type electrode assembly 14, another form of an electrode assembly may be applied, such as a stacked electrode assembly in which the positive electrode and the negative electrode are alternately stacked through the separator. Examples of the battery case include a metallic case such as a cylindrical shape, a square shape, a coin shape, or a button shape and a resin case (laminated battery) formed by laminating a resin sheet.

The case body 15 is, for example, a metallic container with a bottomed cylindrical shape. A gasket 27 is provided between the case body 15 and the sealing assembly 16 to ensure the sealability inside the battery case. The case body 15 preferably has the projecting portion 21, which is formed, for example, by pressing the side surface portion from the outside, for supporting the sealing assembly 16. The projecting portion 21 is preferably formed in an annular shape along the circumferential direction of the case body 15, and the sealing assembly 16 is supported on the upper surface thereof.

The sealing assembly 16 has a filter 22 in which a filter opening 22a is formed, and a valve body disposed on the filter 22. The valve body closes the filter opening 22a of the filter 22, and breaks when the internal pressure of the battery rises by heat generation due to an internal short circuit or the like. In the present embodiment, a lower vent member 23 and an upper vent member 25 are provided as valve bodies, and an insulating member 24 disposed between the lower vent member 23 and the upper vent member 25 and a cap 26 having a cap opening 26a are further provided. Each member constituting the sealing assembly 16 has a disk shape or a ring shape, for example, and each member except the insulating member 24 is electrically connected each other. Specifically, the filter 22 and the lower vent member 23 are joined together at their respective peripheral portions, and the upper vent member 25 and the cap 26 are also joined together at their respective peripheral portions. The lower vent member 23 and the upper vent member 25 are connected together at their respective central portions, and the insulating member 24 is interposed between the respective peripheral portions. When the internal pressure rises by heat generation due to an internal short circuit or the like, for example, the lower vent member 23 is broken at its thin portion, and thereby the upper vent member 25 bulges to the cap 26 side and leaves the lower vent member 23 to block both electrical connections.

In the secondary battery 10 shown in FIG. 1, a positive electrode lead 19 attached to the positive electrode 11 extends to the side of the sealing assembly 16 through the through hole of the insulating plate 17, and a negative electrode lead 20 attached to the negative electrode 12 extends to the bottom side of the case body 15 through the outside of the insulating plate 18. For example, the positive electrode lead 19 is connected to the lower surface of the filter 22, which is a bottom plate of the sealing assembly 16, by welding or the like, and the cap 26, which is a top plate of the sealing assembly 16 electrically connected to the filter 22, serves as a positive electrode terminal. The negative electrode lead 20 is connected to the inner surface of bottom of the case body 15, by welding or the like, and the case body 15 serves as a negative electrode terminal.

[Positive Electrode]

Figure 2:
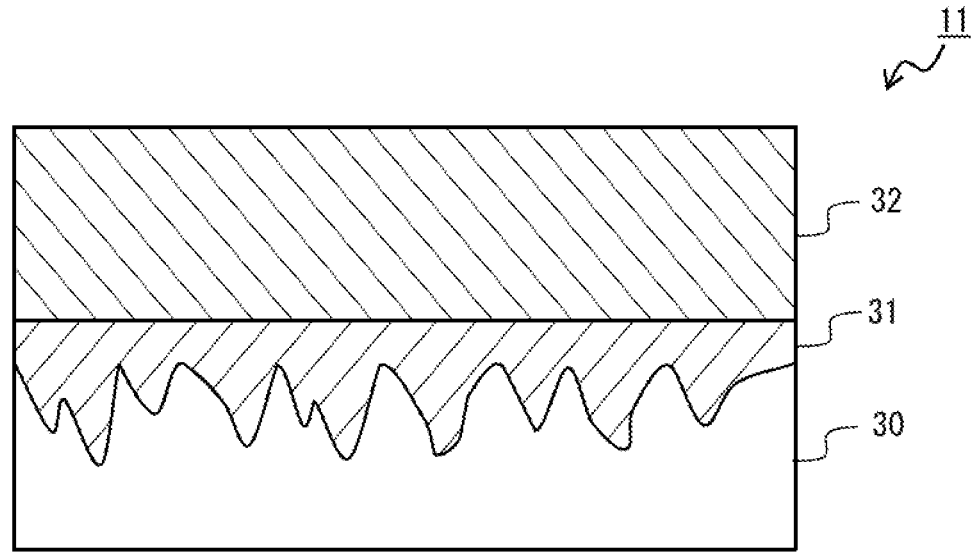
FIG. 2 is a sectional view of a positive electrode according to the first embodiment.

FIG. 2 is a sectional view of the positive electrode according to the first embodiment. The positive electrode 11 shown in FIG. 2 comprises: a positive electrode current collector 30 having a plurality of irregularities on the surface; an intermediate layer 31 provided on the irregular surface of the positive electrode current collector; and a positive electrode mixture layer 32 provided on the intermediate layer 31 and including the positive electrode active material. The intermediate layer 31 includes conductive agent particles and inorganic material particles having higher resistance than the positive electrode active material.

Examples of the positive electrode active material included in the positive electrode mixture layer 32 shown in FIG. 2 include a lithium transition metal oxide containing transition metal elements such as Co, Mn, and Ni. Examples of lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of Na, Mg, Sc, Y, Mn, Fe, Co, Ni, Cu, Zn, Al, Cr, Pb, Sb, and B, $0<x\le1.2$, $0<y\le0.9$, and $2.0\le z\le2.3$). These may be used singly or as a mixture of two or more. From the viewpoint of increasing the capacity of the secondary battery, positive electrode active material preferably include lithium nickel composite oxide such as $Li_xNiO_2$, $Li_xCo_yNi_{1-y}O_2$, and $Li_xNi_{1-y}M_yO_z$ (M: at least one of Na, Mg, Sc, Y, Mn, Fe, Co, Ni, Cu, Zn, Al, Cr, Pb, Sb, and B, $0<x\le1.2$, $0<y\le0.9$, and $2.0\le z\le2.3$).

The positive electrode mixture layer 32 shown in FIG. 2 preferably includes conductive agent particles, from such a viewpoint that the conductivity of the layer can be improved. Examples of the conductive agent particles include carbon particles such as carbon black (CB), acetylene black (AB), ketjen black, and graphite. These may be used singly or in combination of two or more.

The positive electrode mixture layer 32 shown in FIG. 2 preferably includes a binder, from such a viewpoint that positive electrode active materials can be bound to each other to ensure the mechanical strength of the positive electrode mixture layer 32. Examples of the binder include fluorine resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethylcellulose (CMC) or a salt thereof (CMC-Na, CMC-K, CMC-NH₄, or the like, or a partially neutralized salt may be used), polyethylene oxide (PEO), and the like. These may be used singly or in combination of two or more.

As the positive electrode current collector 30 shown in FIG. 2, a foil of a metal such as aluminum or aluminum alloy that is stable in the potential range of the positive electrode, a film with the metal disposed on the surface, or the like is used. The thickness of the positive electrode current collector 30 is, for example, about 10 μm to 100 μm.

The irregularities of the positive electrode current collector 30 shown in FIG. 2 are formed, for example, by subjecting the surface of the positive electrode current collector 30 to electrolytic treatment, embossing, chemical etching, mechanical grinding, polishing with abrasive, or the like. The irregularities of the positive electrode current collector 30 may have any shape, and may have any size and interval. However, as described below, the average depth of the irregularities of the positive electrode current collector 30 is determined within a certain range, in relation to the median particle diameter of the conductive agent particles constituting the intermediate layer 31 and the median particle diameter of the inorganic material particles.

Examples of the conductive agent particles included in the intermediate layer 31 shown in FIG. 2 include the same kind of conductive agent particles as applied to the positive electrode mixture layer 32, for example, carbon particles such as carbon black (CB), acetylene black (AB), ketjen black, and graphite. Other examples include conductive metal oxide particles such as antimony-doped tin oxide, metal particles such as aluminum and copper, and inorganic filler coated with metal. These may be used singly or in combination of two or more. The conductive agent particles preferably include carbon particles from the viewpoints such as the conductivity of the intermediate layer 31 and the manufacturing cost.

The inorganic material particles included in the intermediate layer 31 shown in FIG. 2 are not particularly limited as long as they have higher resistance than the positive electrode active material in the positive electrode mixture layer 32, and for example, they are preferably insulating inorganic material particles having a resistivity of $10^{12}$ Ωcm or more, and examples thereof include metal oxide particles, metal nitride particles, metal fluoride particles, and insulating magnetic particles. Examples of the metal oxide particles include aluminum oxide, titanium oxide, zirconium oxide, silicon oxide, manganese oxide, magnesium oxide, and nickel oxide. Examples of the metal nitride particles include boron nitride, aluminum nitride, magnesium nitride, and silicon nitride. Examples of the metal fluoride particles include aluminum fluoride, lithium fluoride, sodium fluoride, magnesium fluoride, calcium fluoride, barium fluoride, aluminum hydroxide, and boehmite. Examples of the insulating magnetic particles include Ni—Cu—Zn ferrite. Inorganic material particles preferably include at least one of the group consisting of aluminum oxide, titanium oxide, silicon oxide, and manganese oxide, and more preferably include at least aluminum oxide, from the viewpoint such as an insulating property, a high melting point, and lower oxidizing power than a positive electrode active material. When internal short circuit occurs, the redox reaction between the positive electrode active material and the positive electrode current collector 30 (especially the positive electrode current collector of aluminum or aluminum alloy) may generate heat, but the above redox reaction can be suppressed by using the inorganic material particles having lower oxidizing power than the positive electrode active material, and thus the amount of heat generated by the battery can be suppressed.

The intermediate layer 31 shown in FIG. 2 preferably includes a binder, from the viewpoint such that the particles such as inorganic material particles or conductive agent particles are bonded each other to ensure the mechanical strength of the intermediate layer 31 and from the viewpoint such that the bonding property between the intermediate layer 31 and the positive electrode current collector 30 can be improved. Examples of the binder include the same kind as the binder applied to the positive electrode mixture layer 32, for example, fluorine resins such as polytetrafluoroethylene (PTFE) and polyvinylidene fluoride (PVdF), polyacrylonitrile (PAN), polyimide resin, acrylic resin, and polyolefin resin. These resins may be used in combination with carboxymethylcellulose (CMC) or a salt thereof (CMC-Na, CMC-K, CMC-NH$_4$, or the like, or a partially neutralized salt may be used), polyethylene oxide (PEO), and the like. These may be used singly or in combination of two or more.

The ratio of the median particle diameter of the conductive agent particles constituting the intermediate layer 31 shown in FIG. 2 to the average depth of the irregularities of the positive electrode current collector 30 and the ratio of the median particle diameter of the inorganic material particles constituting the intermediate layer 31 shown in FIG. 2 to the average depth of the irregularities of the positive electrode current collector 30 should be both 5:6 or less as described above, but the ratio of the median particle diameter of the conductive agent particles to the average depth of the irregularities of the positive electrode current collector 30 is preferably 1:15 or less and the ratio of the median particle diameter of the inorganic material particles to the average depth of the irregularities of the positive electrode current collector 30 is preferably 5:8 or less, from the viewpoint such that an increase in resistance of the positive electrode 11 can be more suppressed.

The lower limit of the ratio of the median particle diameter of the conductive agent particles constituting the intermediate layer 31 shown in FIG. 2 to the average depth of the irregularities of the positive electrode current collector 30 is preferably 1:20 or more. The lower limit of the ratio of the median particle diameter of the inorganic material particles constituting the intermediate layer 31 shown in FIG. 2 to the average depth of the irregularities of the positive electrode current collector 30 is preferably 5:20 or more, and more preferably 5:16 or more. If the lower limit of the ratio of the two is out of the above range, the effect of suppressing an increase in resistance of the positive electrode 11 may be reduced as compared with the case where the above range is satisfied.

The average depth of the irregularities of the positive electrode current collector 30 shown in FIG. 2 may be set appropriately depending on the median particle diameter of the conductive agent particles constituting the intermediate layer 31 or inorganic material particles, and the like, and preferably is 0.6 μm or more, and more preferably 0.8 μm or more. If the average depth of the irregularities of the positive electrode current collector 30 is less than 0.6 μm, a sufficient contact area between the intermediate layer 31 and the positive electrode current collector 30 is hardly ensured, which may reduce the effect of suppressing an increase in resistance of the positive electrode 11, as compared with the case where the average depth of the irregularities of the positive electrode current collector 30 is 0.6 μm or more.

The upper limit of the average depth of the irregularities of the positive electrode current collector 30 shown in FIG. 2 is, for example, preferably 2.0 μm or less, and more preferably 1.6 μm or less. If the average depth of the irregularities of the positive electrode current collector 30 is more than 2.0 μm, the strength of the positive electrode current collector 30 may be reduced.

The median particle diameter of the inorganic material particles constituting the intermediate layer 31 shown in FIG. 2 may be set appropriately depending on the average depth of the irregularities of the positive electrode current collector 30, and the like, and is preferably 0.2 μm or more and 1.0 μm or less, more preferably 0.5 μm or more and 0.7 μm or less. If the median particle diameter of inorganic material particles is less than 0.2 μm and more than 1.0 μm, the intermediate layer in which inorganic material particles are unevenly distributed is more easily formed, and the effect of suppressing the amount of heat generated by the battery during internal short circuit may be reduced, as compared with the case where the median particle diameter of inorganic material particles satisfies the above range.

The median particle diameter of the conductive agent particles constituting the intermediate layer 31 shown in FIG. 2 may be set appropriately depending on the average depth of the irregularities of the positive electrode current collector 30, and the like, and is preferably 0.01 μm or more and 1.0 μm or less, more preferably is 0.04 μm or more and 0.5 μm or less. If the median particle diameter of the conductive agent particles is less than 0.01 μm and more than 1.0 μm, the intermediate layer in which conductive agent particles are unevenly distributed is more easily formed and the effect of suppressing an increase in resistance of the positive electrode 11 may be reduced, as compared with the case where the median particle diameter of the conductive agent particles satisfies the above range.

The content of the inorganic material particles in the intermediate layer 31 shown in FIG. 2 is, for example, preferably 80% by mass or more and 98% by mass or less. The content of the conductive agent particles in the intermediate layer 31 shown in FIG. 2 is, for example, preferably in the range of 0.1% by mass to 20% by mass. When the contents of the inorganic material particles and the conductive agent particles in the intermediate layer 31 do not satisfy the above range, the effect of suppressing an increase in resistance of the positive electrode 11 may be reduced or the effect of suppressing the amount of heat generated by the battery during internal short circuit may be reduced, as compared with the case where the above range is satisfied.

The thickness of the intermediate layer 31 shown in FIG. 2 is, for example, preferably in the range of 0.5 μm or more and 10 μm or less, and more preferably 1.0 μm or more and 5.0 μm or less. When the thickness of the intermediate layer 31 does not satisfy the above range, the effect of suppressing an increase in resistance of the positive electrode 11 may be reduced or the effect of suppressing the amount of heat generated by the battery during internal short circuit may be reduced, as compared with the case where the above range is satisfied.

An example of the method for producing the positive electrode according to the first embodiment is described. On the surface of the positive electrode current collector, a plurality of irregularities are formed by electrolytic treatment, embossing treatment, chemical etching, mechanical grinding, polishing with abrasives, or the like applied to the surface of the positive electrode current collector. On the irregular surface of the positive electrode current collector, a slurry for the intermediate layer including the above conductive agent particles, inorganic material particles, and the like is applied and dried to form an intermediate layer and to roll the intermediate layer. On the intermediate layer, a positive electrode mixture slurry including a positive electrode active material and the like is applied and dried to form a positive electrode mixture layer and to roll the positive electrode mixture layer. The positive electrode can be obtained as described above.

Figure 3:
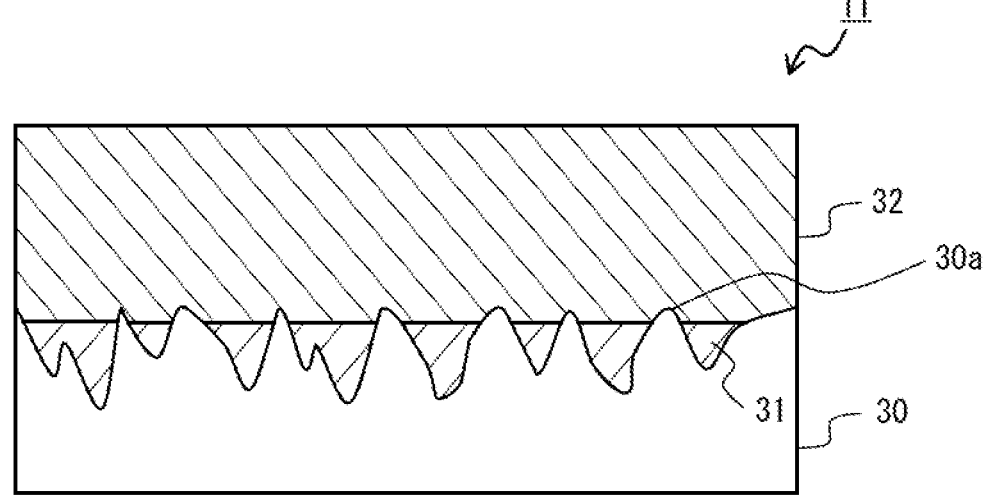
FIG. 3 is a sectional view of a positive electrode according to the second embodiment.

FIG. 3 is a sectional view of the positive electrode according to the second embodiment. The positive electrode 11 in FIG. 3 comprises a positive electrode current collector 30 having a plurality of irregularities on the surface thereof; an intermediate layer 31 provided on the irregular surface of the positive electrode current collector 30; and a positive electrode mixture layer 32 provided on the intermediate layer 31 and including a positive electrode active material. The intermediate layer 31 includes inorganic material particles having higher resistance than the positive electrode active material.

The positive electrode active material included in the positive electrode mixture layer 32 shown in FIG. 3 is as described above. The positive electrode mixture layer 32 shown in FIG. 3 preferably includes a binder.

For the positive electrode current collector 30 shown in FIG. 3, a metal foil that is stable in the potential range of the positive electrode such as aluminum or an aluminum alloy, a film in which the metal is disposed on the surface layer, or the like can be used.

The average depth of the irregularities of the positive electrode current collector 30 shown in FIG. 3 is 0.6 μm or more, and at least one of the projections 30a of the irregularities of the positive electrode current collector 30 penetrates the interface between the intermediate layer 31 and the positive electrode mixture layer 32 and projects into the positive electrode mixture layer 32. As described above, at least one of the projections 30a of the irregularities of the positive electrode current collector 30 projects into the positive electrode mixture layer 32, forming a conduction path between the positive electrode current collector 30 and the positive electrode mixture layer 32, and hence an increase in resistance of the positive electrode 11 is suppressed. From the viewpoint such that the number of projections 30a of the positive electrode current collector 30 which are in contact with the positive electrode mixture layer 32 is increased to allow an increase in resistance of the positive electrode 11 to be more suppressed, the average depth of the irregularities of the positive electrode current collector 30 shown in FIG. 3 is preferably 0.8 μm or more. From the viewpoint of suppressing the amount of heat generated, it is preferably 1.2 μm or more.

The upper limit of the average depth of the irregularities of the positive electrode current collector 30 shown in FIG. 3 is, for example, preferably 2.0 μm or less and more preferably 1.6 μm or less. If the average depth of the irregularities of the positive electrode current collector 30 is more than 2.0 μm, the strength of the positive electrode current collector 30 may be reduced as compared with the case where it is 2.0 μm or less.

The irregularities of the positive electrode current collector 30 shown in FIG. 3 are formed, for example, by subjecting the surface of the positive electrode current collector to electrolytic treatment, embossing treatment, chemical etching, mechanical grinding, polishing with abrasive, or the like. When the average depth of the irregularities of the positive electrode current collector 30 is 0.6 μm or more, the irregularities of the positive electrode current collector 30 may have any shape, and may have any size and interval.

In the cross section of the positive electrode current collector 30, the length of recesses of the positive electrode current collector 30 which are in contact with the intermediate layer 31 is preferably 0.8 or more times, and more preferably 1 or more times the length of projections of the positive electrode current collector which are in contact with the positive electrode mixture layer 32. In the cross section of the positive electrode current collector 30, when the length of recesses of the positive electrode current collector 30 which are in contact with the intermediate layer 31 is less than 0.8 times the length of projections which are in contact with the positive electrode mixture layer 32, the range of existence of the intermediate layer 31 on the surface of the positive electrode current collector 30 is too small, and hence the short circuit current during internal short circuit may be insufficiently suppressed. In the cross section of the positive electrode current collector 30, the length of recesses of the positive electrode current collector 30 which are in contact with the intermediate layer 31 is preferably 1.8 or less times, and more preferably 1.6 or less times the length of projections of the positive electrode current collector which are in contact with the positive electrode mixture layer 32. In the cross section of the positive electrode current collector 30, when the length of recesses of the positive electrode current collector 30 which are in contact with the intermediate layer 31 is more than 1.8 times the length of projections of the positive electrode current collector which are in contact with the positive electrode mixture layer 32, the range of existence of the intermediate layer 31 is too wide, and the conductivity between the positive electrode current collector 30 and the positive electrode mixture layer 32 may be reduced.

The length of recesses of the positive electrode current collector 30 which are in contact with the intermediate layer 31 and the length of projections of the positive electrode current collector 30 which are in contact with the positive electrode mixture layer 32 are measured as follows. The positive electrode is embedded in a resin, and a cross section of the positive electrode is produced by cross section polisher (CP) processing or the like. Using a scanning electron microscope (SEM), the cross section of the positive electrode current collector (the interface between the intermediate layer and the positive electrode current collector and the interface between the positive electrode current collector and the intermediate layer) is observed over a predetermined range with a visual field of 1000-fold magnification, and from the observed image, the total length of respective recesses of the positive electrode current collector which are in contact with the intermediate layer and the total length of respective projections which are in contact with the positive electrode mixture layer 32 are measured. The predetermined range is a range of 50 μm. The same operation is performed with five different visual fields, and the average value of the total length of respective recesses and the average value of the total length of respective projections are determined, and these are regarded as the length of recesses of the positive electrode current collector which are in contact with the intermediate layer 31 and the length of projections of the positive electrode current collector 30 which are in contact with the positive electrode mixture layer 32.

The intermediate layer 31 shown in FIG. 3 may include the above conductive agent particles, but is better not to include conductive agent particles. The intermediate layer 31 itself shown in FIG. 3 does not include conductive agent particles and thereby becomes a layer with high resistance (low conductivity), and as described above, a conduction path due to the projections 30a is formed between the positive electrode current collector 30 and the positive electrode mixture layer 32 and hence an increase in resistance of the positive electrode is sufficiently suppressed. In the state in which internal short circuit has occurred, the intermediate layer with high resistance (low conductivity) is present around a conductive foreign matter and the like and hence the amount of heat generated by the battery can be suppressed as compared with the case where no intermediate layer is formed between the positive electrode current collector and the positive electrode mixture layer. In the intermediate layer 31 shown in FIG. 3, a simpler constitution of inorganic material particles and a binder without a conductive agent is assumed to generate a smaller amount of heat in the battery if internal short circuit occurs, as compared with the case where the intermediate layer 31 also includes the conductive agent.

The ratio of the median particle diameter of the inorganic material particles constituting the intermediate layer 31 shown in FIG. 3 to the average depth of the irregularities of the positive electrode current collector 30 is preferably 5:20 or more and 5:6 or less, more preferably 5:18 or more and 5:8 or less, and more preferably 5:16 or more and 5:12 or less. If the ratio of the median particle diameter of the inorganic material particles constituting the intermediate layer 31 shown in FIG. 3 to the average depth of the irregularities of the positive electrode current collector 30 does not satisfy the above range, the effect of suppressing an increase in resistance of the positive electrode may be reduced as compared with the case where the above range is satisfied.

The median particle diameter of the inorganic material particles constituting the intermediate layer 31 shown in FIG. 3 is, for example, preferably 0.2 μm or more and 1.0 μm or less and more preferably 0.5 μm or more and 0.7 μm or less. If the median particle diameter of the inorganic material particles is less than 0.2 μm and more than 1.0 μm, the intermediate layer in which inorganic material particles are unevenly distributed is more easily formed and the effect of suppressing the amount of heat generated by the battery during internal short circuit may be reduced, as compared with the case where the median particle diameter of the inorganic material particles satisfies the above range.

The content of the inorganic material particles in the intermediate layer 31 shown in FIG. 3 is, for example, preferably 80% by mass or more and 99.5% by mass or less. When the content of the inorganic material particles in the intermediate layer 31 does not satisfy the above range, the effect of suppressing the amount of heat generated by the battery during internal short circuit may be reduced, as compared with the case where the above range is satisfied. As the content per unit volume (% by mass) of the inorganic material particles in the intermediate layer 31 shown in FIG. 3, the proportion of the inorganic material particles in the intermediate layer 31 can be increased, as compared with the content per unit volume (% by mass) of the inorganic material particles of the intermediate layer 31 shown in FIG. 2. This is because a conduction path is formed between the positive electrode current collector 30 and the positive electrode mixture layer 32 even when the intermediate layer 31 shown in FIG. 3 includes no conductive agent.

An example of the method for producing the positive electrode according to the second embodiment is described. On the surface of the positive electrode current collector, a plurality of irregularities are formed by electrolytic treatment, embossing treatment, chemical etching, mechanical grinding, polishing with abrasives, or the like applied to the surface of the positive electrode current collector. On the irregular surface of the positive electrode current collector, a slurry for the intermediate layer including the above inorganic material particles and the like is applied. In order to expose the projections of the irregularities of the positive electrode current collector, the excess slurry for the intermediate layer on the surface of the positive electrode current collector is wiped off, and then the slurry for the intermediate layer on the positive electrode current collector is dried to form the intermediate layer. On the intermediate layer, a positive electrode mixture slurry including a positive electrode active material and the like is applied and dried to form a positive electrode mixture layer and to roll the positive electrode mixture layer. As described above, the positive electrode according to the second embodiment can be obtained.

[Negative Electrode]

The negative electrode 12 comprises, for example, the negative electrode current collector, such as the metal foil, and the negative electrode mixture layer formed on the negative electrode current collector. As the negative electrode current collector, a foil of a metal stable in the potential range of the negative electrode such as copper, the film in which the metal is disposed on an outer layer, or the like can be used. The negative electrode mixture layer includes the negative electrode active material, the binder, and the thickener.

The negative electrode 12 is obtained, for example, by applying and drying the negative electrode mixture slurry including the negative electrode active material, the thickener, and the binder on the negative electrode current collector to form the negative electrode mixture layer on the negative electrode current collector and by rolling the negative electrode mixture layer. The negative electrode mixture layer may be provided on the both surfaces of the negative electrode current collector.

The negative electrode active material is not particularly limited as long as it is a material capable of absorbing and desorbing lithium ions, and examples thereof include lithium alloys such as a metallic lithium, a lithium-aluminum alloy, a lithium-lead alloy, a lithium-silicon alloy, and a lithium-tin alloy; carbon materials such as graphite, coke, and an organic sintered body; and metal oxides such as $SnO_2$, $SnO$, and $TiO_2$. These may be used singly or in combination of two or more.

As the binder included in the negative electrode mixture layer, a fluorine resin, PAN, a polyimide resin, an acrylic resin, a polyolefin resin, or the like can be used as in the case of the positive electrode. When the negative electrode mixture slurry is prepared by using an aqueous solvent, styrene-butadiene rubber (SBR), CMC or a salt thereof, polyacrylic acid (PAA) or a salt thereof (which is PAA-Na, PAA-K, or the like, or may be partially neutralized salt), polyvinyl alcohol (PVA), or the like is preferably used.

[Separator]

An ion-permeable and insulating porous sheet or the like is used as the separator 13. Specific examples of the porous sheet include a microporous thin film, a woven fabric, and a nonwoven fabric. Suitable examples of the material for the separator include olefin resins such as polyethylene and polypropylene, and cellulose. The separator 13 may be a laminate having a cellulose fiber layer and a layer of fibers of a thermoplastic resin such as an olefin resin. The separator 13 may also be a multi-layered separator including a polyethylene layer and a polypropylene layer, and a separator coated with a material such as an aramid resin or a ceramic on the surface thereof may be used.

[Electrolyte]

The electrolyte includes a solvent and an electrolyte salt dissolved in the solvent. The electrolyte is not limited to a liquid electrolyte (non-aqueous electrolyte solution), and may be a solid electrolyte using a gel-like polymer or the like. As a solvent, a non-aqueous solvent such as an ester, an ether, a nitrile such as acetonitrile, an amide such as dimethylformamide, or a mixed solvent of two or more of these, or water can be used. The non-aqueous solvent may contain a halogen substituted product in which at least some hydrogens of any of these solvents are replaced by a halogen atom such as fluorine.

Examples of the above esters include cyclic carbonate esters such as ethylene carbonate (EC), propylene carbonate (PC), and butylene carbonate; chain carbonate esters such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylic acid esters such as $\gamma$-butyrolactone and $\gamma$-valerolactone; and chain carboxylic acid esters such as methyl acetate, ethyl acetate, propyl acetate, methyl propionate (MP), and ethyl propionate.

Examples of the above ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methyl furan, 1,8-cineole, and crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the above halogen substituted product, fluorinated cyclic carbonate esters such as fluoroethylene carbonate (FEC); fluorinated chain carbonate esters; fluorinated chain carboxylic acid esters such as methyl fluoropropionate (FMP); or the like are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lower aliphatic carboxylic acid lithium, $Li_2B_4O_7$, borates such as $Li(B(C_2O_4)F_2)$, and imide salts such as $LiN(SO_2CF_3)_2$, $LiN(ClF_{2l+1}SO_2)(C_mF_{b\ 2m+1}SO_2)$ (l and m are an integer of 1 or more). For the lithium salt, these may be used singly or a mixture of various lithium salts may be used. Among them, $LiPF_6$ is preferably used from the viewpoints such as ion conductivity and electrochemical stability. The concentration of the lithium salt is preferably 0.8 to 1.8 mol per liter of a solvent.

EXAMPLES

Hereinafter, the present disclosure will be described in more detail with reference to Examples, but the present disclosure is not limited to the following Examples.

Example 1

[Production of Positive Electrode]

94 parts by mass of aluminum oxide (median particle diameter of 0.5 μm) as inorganic material particles, 5 parts by mass of acetylene black (median particle diameter of 0.04 μm) as conductive agent particles, and 1 part by mass of polyvinylidene fluoride (PVDF) as a binder were mixed, and an appropriate amount of N-methyl-2-pyrrolidone (NMP) was further added to prepare an slurry for the intermediate layer. As a positive electrode current collector, the above slurry for the intermediate layer was applied and dried on both surfaces of an aluminum foil having a plurality of irregularities on the surface (thickness of 15 μm and average depth of irregularities of 0.8 μm) to form an intermediate layer having a thickness of 3.5 μm. The ratio of the median particle diameter of the inorganic material particles to the average depth of the irregularities of the positive electrode current collector is 5:8, and the ratio of the median particle diameter of the conductive agent particles to the average depth of the irregularities of the positive electrode current collector is 0.4:8.

97 parts by mass of lithium transition metal oxide as the positive electrode active material, 1.5 parts by mass of acetylene black (AB), and 1.5 parts by mass of polyvinylidene fluoride (PVDF) were mixed, and then an appropriate amount of N-methyl-2-pyrrolidone (NMP) was added to prepare a positive electrode mixture slurry. This positive electrode mixture slurry was applied on the intermediate layer formed on both surfaces of the positive electrode current collector. The resulting coating was dried and rolled using a pressure roller to produce a positive electrode consisting of the positive electrode current collector, the intermediate layer formed on both surfaces of the positive electrode current collector, and the positive electrode mixture layer formed on the intermediate layer.

[Production of Negative Electrode]

100 parts by mass of artificial graphite, 1 part by mass of carboxymethylcellulose (CMC), and 1 part by mass of styrene-butadiene rubber (SBR) were mixed to prepare a negative electrode mixture slurry. Then, the negative electrode mixture slurry was applied to both surfaces of the negative electrode current collector consisting of copper foil. The resulting coating was dried and then rolled using a pressure roller to produce a negative electrode in which a negative electrode mixture layer was formed on both surfaces of the positive electrode current collector.

[Preparation of Electrolyte]

Ethylene carbonate (EC), methyl ethyl carbonate (EMC), and dimethyl carbonate (DMC) were mixed in a volume ratio of 3:3:4. In the mixed solvent, $LiPF_6$ was dissolved to a concentration of 1.2 mol/L to prepare an electrolyte (non-aqueous electrolyte).

[Preparation of Secondary Battery]

Each of the above positive electrode and negative electrode was cut into predetermined dimensions, attached with an electrode tab, and wound through a separator to prepare a wound electrode body. Then, the electrode body was housed in an aluminum laminate film, and the above non-aqueous electrolyte was injected and sealed. This was the secondary battery in Example 1.

Example 2

A positive electrode was produced in the same manner as in Example 1, except that an aluminum foil having a plurality of irregularities on the surface (thickness of 15 μm and average depth of irregularities of 1.2 μm) was used as the positive electrode current collector. The ratio of the median particle diameter of the inorganic material particles to the average depth of the irregularities of the positive electrode current collector in Example 2 is 5:12, and the ratio of the median particle diameter of the conductive agent particles to the average depth of the irregularities of the positive electrode current collector is 0.4:12. Using this as the positive electrode in Example 2, a secondary battery was produced in the same manner as in Example 1.

Example 3

A positive electrode was produced in the same manner as in Example 1, except that an aluminum foil having a plurality of irregularities on the surface (thickness of 15 μm and average depth of irregularities of 1.6 μm) was used as the positive electrode current collector. The ratio of the median particle diameter of the inorganic material particles to the average depth of the irregularities of the positive electrode current collector in Example 3 is 5:16, and the ratio of the median particle diameter of the conductive agent particles to the average depth of the irregularities of the positive electrode current collector is 0.4:16. Using this as the positive electrode in Example 3, a secondary battery was produced in the same manner as in Example 1.

Example 4

A positive electrode was produced in the same manner as in Example 1, except that the above slurry for the intermediate layer was applied on both surfaces of an aluminum foil having a plurality of irregularities on the surface (thickness of 15 μm and average depth of irregularities of 0.8 μm), and then the excess slurry for the intermediate layer on the surface of the aluminum positive electrode current collector was wiped off so as to expose the projections of the irregularities of the aluminum foil, and the slurry for the intermediate layer on the positive electrode current collector was dried to form the intermediate layer. Using this as the positive electrode in Example 4, a secondary battery was produced in the same manner as in Example 1.

Example 5

A positive electrode was produced in the same manner as in Example 1, except that the above slurry for the intermediate layer was applied on both surfaces of an aluminum foil having a plurality of irregularities on the surface (thickness of 15 μm and average depth of irregularities of 1.2 μm), and then the excess slurry for the intermediate layer on the surface of the aluminum positive electrode current collector was wiped off so as to expose the projections of irregularities of the aluminum foil, and the slurry for the intermediate layer on the positive electrode current collector was dried to form the intermediate layer. Using this as the positive electrode in Example 5, a secondary battery was produced in the same manner as in Example 1.

Example 6

A positive electrode was produced in the same manner as in Example 1, except that the above slurry for the intermediate layer was applied on both surfaces of an aluminum foil having a plurality of irregularities on the surface (thickness of 15 μm and average depth of irregularities of 1.6 μm), and then the excess slurry for the intermediate layer on the surface of the aluminum positive electrode current collector was wiped off so as to expose the projections of irregularities of the aluminum foil, and the slurry for the intermediate layer on the positive electrode current collector was dried to form the intermediate layer. Using this as the positive electrode in Example 5, a secondary battery was produced in the same manner as in Example 1.

Comparative Example 1

A positive electrode was produced in the same manner as in Example 1, except that an aluminum foil having a plurality of irregularities on the surface (thickness of 15 μm and average depth of irregularities of 0.1 μm) was used as a positive electrode current collector and a positive electrode mixture layer was formed without forming the intermediate layer on the aluminum foil. Using this as the positive electrode in Comparative Example 1, a secondary battery was produced in the same manner as in Example 1.

Comparative Example 2

A positive electrode was produced in the same manner as in Example 1, except that an aluminum foil having a plurality of irregularities on the surface (thickness of 15 μm and average depth of irregularities of 0.1 μm) was used as a positive electrode current collector. The ratio of the median particle diameter of the inorganic material particles to the average depth of the irregularities of the positive electrode current collector in Comparative Example 2 is 5:1, and the ratio of the median particle diameter of the conductive agent particles to the average depth of the irregularities of the positive electrode current collector is 0.4:1. Using this as the positive electrode in Comparative Example 2, a secondary battery was produced in the same manner as in Example 1.

[Resistivity of Positive Electrode]

The resistivity of the positive electrode of each Example and each Comparative Example was measured according to a resistivity test method based on a four-probe method of conductive plastic, JIS K7194:1994.

[Nailing Test]

For the secondary battery of each of Examples and Comparative Example, the nailing test was performed in the following procedure.

(1) Charging was performed until the battery voltage reached 4.2 V at a constant current of 600 mA under an environment of 25° C., and then charging was continued until the current value reached 90 mA at a constant voltage.

(2) Under an environment of 25° C., the tip of a round nail having a 2.7 mmφ diameter was contact with the center portion in the side surface of the battery charged in (1), the round nail pierced thereto in the stacking direction of the electrode assembly in the battery at a rate of 1 mm/s, and the round nail was stopped to pierce immediately after a battery voltage drop due to an internal short circuit was detected.

(3) The amount of heat generation (J) was calculated as V×I×t, where V is the voltage and I is the current measured after t seconds between start and stop of the short circuit of the battery induced by the round nail.

Table 1 shows: the median particle diameter of the inorganic material particles used in each Example and Comparative Example; the average depth of the irregularities of the positive electrode current collector; the ratio of the median particle diameter of the inorganic material particles to the average depth of the irregularities of the positive electrode current collector; the content of conductive agent particles in the intermediate layer; the resistivity of the positive electrode in each Example and each Comparative Example; and results of the nailing test of the battery in each Example and each Comparative Example (the amount of heat generated by the battery). The conductive agent particles are omitted because they have a smaller median particle diameter than the inorganic material particles.

collector and the positive electrode mixture layer to suppress the amount of heat generated by the battery during internal short circuit.

REFERENCE SIGNS LIST

10: Secondary battery
11: Positive electrode
12: Negative electrode
13: Separator
14: Electrode assembly
15: Case body
16: Sealing assembly
17, 18: Insulating plate

TABLE 1

| | Median particle diameter of inorganic material particles/μm | Average depth of irregularities of positive electrode current collector/μm | Ratio of median particle diameter of inorganic material particles to average depth of irregularities of positive electrode current collector | Content of conductive agent particles in intermediate layer/% by mass | Resistivity of positive Electrode/Ω cm | Heat generation in battery In nailing test/J |
|---|---|---|---|---|---|---|
| Example 1 | 0.5 | 0.8 | 5:8 | 5 | 60 | 2.0 |
| Example 2 | 0.5 | 1.2 | 5:12 | 5 | 40 | 1.0 |
| Example 3 | 0.5 | 1.6 | 5:16 | 5 | 30 | 2.5 |
| Example 4 | 0.5 | 0.8 | 5:8 | 5 | $1.0*10^{-6}$ | 9.0 |
| Example 5 | 0.5 | 1.2 | 5:12 | 5 | $8.0*10^{-5}$ | 8.5 |
| Example 6 | 0.5 | 1.6 | 5:16 | 5 | $9.2*10^{-5}$ | 8.2 |
| Comparative Example 1 | — | 0.1 | — | — | $3.0*10^{-6}$ | 11.0 |
| Comparative Example 2 | 0.5 | 0.1 | 5:1 | 5 | 80 | 8.9 |

In Examples 1 to 6 having the intermediate layer, an increase in the resistivity of the positive electrode was suppressed as compared with Comparative Example 2 having the intermediate layer. In Examples 1 to 6 having the intermediate layer, the amount of heat generated by the battery in the nailing test was suppressed as compared with Comparative Example 1 having no intermediate layer. That is, the positive electrode current collector having a plurality of irregularities on the surface; the intermediate layer provided on the irregularities of the positive electrode current collector; and the positive electrode mixture layer provided on the intermediate layer and including the positive electrode active material are comprised, and (1) the intermediate layer includes conductive agent particles and inorganic material particles having higher resistance than the positive electrode active material, wherein the ratio of the median particle diameter of the conductive agent particles to the average depth of the irregularities of the positive electrode current collector and the ratio of the median particle diameter of the inorganic material particles to the average depth of the irregularities of the positive electrode current collector are both 5:6 or less, or (2) the intermediate layer includes inorganic material particles having higher resistance than the positive electrode active material, wherein the average depth of the irregularities of the positive electrode current collector is 0.6 μm or more, and using a secondary battery positive electrode in which at least one of the projections of the irregularities of the positive electrode current collector penetrates the interface between the intermediate layer and the positive electrode mixture layer and projects into the positive electrode mixture layer, an increase in resistance of the positive electrode can be suppressed in a state in which no internal short circuit occurs even when the intermediate layer is provided between the positive electrode current

19: Positive electrode lead
20: Negative electrode lead
21: Projecting portion
22: Filter
22*a*: Opening of filter
23: Lower vent member
24: Insulating member
25: Upper vent member
26: Cap
26*a*: Cap opening
27: Gasket
30: Positive electrode current collector
30*a*: Projections
31: Intermediate layer
32: Positive electrode mixture layer

The invention claimed is:

1. A secondary battery positive electrode, comprising:

a positive electrode current collector having a plurality of irregularities on a surface thereof;

an intermediate layer provided on the irregularities of the positive electrode current collector; and a positive electrode mixture layer provided on the intermediate layer and including a positive electrode active material, wherein the intermediate layer includes inorganic material particles having higher resistance than the positive electrode active material, and an average depth of the irregularities of the positive electrode current collector is 0.6 μm or more, and at least one of projections of the irregularities of the positive electrode current collector penetrates an interface between the intermediate layer and the positive electrode mixture layer and projects into the positive electrode mixture layer.

2. The secondary battery positive electrode according to claim 1, wherein the average depth of the irregularities of the positive electrode current collector is 2.0 μm or less.

3. The secondary battery positive electrode according to claim 1, wherein a ratio of a median particle diameter of the inorganic material particles to the average depth of the irregularities of the positive electrode current collector is 5:20 or more and 5:6 or less.

4. The secondary battery positive electrode according to claim 1, wherein the intermediate layer consists only of the inorganic material particles and a binder.

5. The secondary battery positive electrode according to claim 1, wherein in a cross section of the positive electrode current collector, a length of recesses of the positive electrode current collector which are in contact with the intermediate layer is 0.8 or more times and 1.8 or less times a length of projections of the positive electrode current collector which are in contact with the positive electrode mixture layer.

6. The secondary battery positive electrode according to claim 1, wherein the median particle diameter of the inorganic material particles is 0.2 μm or more and 1.0 μm or less.

7. The secondary battery positive electrode according to claim 1, wherein the inorganic material particles have a resistivity of $10^{12}$ Ωcm or more, and the inorganic material particles are at least one of the group consisting of metal oxide particles, metal nitride particles, metal fluoride particles, and insulating magnetic particles.

8. A secondary battery, comprising:

the positive electrode according to claim 1;

a negative electrode; and an electrolyte.

9. The secondary battery positive electrode according to claim 1, wherein a tip of at least one of the projections of the irregularities is spaced away from the positive electrode mixture layer in a thickness direction of the current collector.

* * * * *